United States Patent
Panandiker et al.

(10) Patent No.: US 6,251,846 B1
(45) Date of Patent: *Jun. 26, 2001

(54) LAUNDRY DETERGENT COMPOSITIONS WITH CYCLIC AMINE BASED POLYMERS TO PROVIDE APPEARANCE AND INTEGRITY BENEFITS TO FABRICS LAUNDERED THEREWITH

(75) Inventors: Rajan Keshav Panandiker, West Chester; Sherri Lynn Randall, Hamilton; Eugene Paul Gosselink, Cincinnati, all of OH (US); William Conrad Wertz, West Harrison, IN (US); Soren Hildebrandt, Speyer (DE); Elisabeth Kappes; Dieter Boeckh, both of Limburgerhof (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/508,609
(22) PCT Filed: Sep. 15, 1998
(86) PCT No.: PCT/US98/19143
  § 371 Date: Mar. 14, 2000
  § 102(e) Date: Mar. 14, 2000
(87) PCT Pub. No.: WO99/14300
  PCT Pub. Date: Mar. 25, 1999

Related U.S. Application Data
(60) Provisional application No. 60/058,931, filed on Sep. 15, 1997.

(51) Int. Cl.$^7$ ............................ C11D 1/83; C11D 1/94; C11D 3/26; C11D 3/30
(52) U.S. Cl. .................... 510/332; 510/327; 510/340; 510/350; 510/351; 510/352; 510/356; 510/360; 510/400; 510/500; 510/501; 544/242; 544/402; 548/335.5; 548/300.1
(58) Field of Search .................... 510/327, 328, 510/340, 332, 350, 351, 352, 356, 360, 400, 500, 501; 544/242, 402; 548/335.5, 300.1

(56) References Cited

U.S. PATENT DOCUMENTS 3,917,817 * 11/1975 Vanlerberghe et al. ............... 424/70
4,013,787 * 3/1977 Vanlerberghe et al. ............... 424/70

FOREIGN PATENT DOCUMENTS

19643281 * 4/1998 (DE).
 209787 * 7/1986 (EP).

* cited by examiner

Primary Examiner—Gregory Delcotto
(74) Attorney, Agent, or Firm—Marianne Dressman; Kim William Zerby; Steven W. Miller

(57) ABSTRACT

Detergent compositions and fabric conditioning compositions which utilize certain anionically modified, oxidized cyclic amine based polymers, oligomers or copolymer materials. These anionically modified, cyclic amine based polymers, oilgomers or copolymers materials can impart fabric appearance and integrity benefits to fabrics and textiles laundered in washing solutions which contain such materials.

7 Claims, No Drawings

LAUNDRY DETERGENT COMPOSITIONS WITH CYCLIC AMINE BASED POLYMERS TO PROVIDE APPEARANCE AND INTEGRITY BENEFITS TO FABRICS LAUNDERED THEREWITH

This application claims the benefit of U.S. Provisional application Ser. No. 60/058,931, filed Sep. 15, 1997.

TECHNICAL FIELD

The present invention relates to compositions, in either liquid or granular form, for use in laundry applications, wherein the compositions comprise certain cyclic amine based polymer, oligomer or copolymer materials which impart appearance and integrity benefits to fabrics and textiles laundered in washing solutions formed from such compositions.

BACKGROUND OF THE INVENTION

It is, of course, well known that alternating cycles of using and laundering fabrics and textiles, such as articles of worn clothing and apparel, will inevitably adversely affect the appearance and integrity of the fabric and textile items so used and laundered. Fabrics and textiles simply wear out over time and with use. Laundering of fabrics and textiles is necessary to remove soils and stains which accumulate therein and thereon during ordinary use. However, the laundering operation itself, over many cycles, can accentuate and contribute to the deterioration of the integrity and the appearance of such fabrics and textiles.

Deterioration of fabric integrity and appearance can manifest itself in several ways. Short fibers are dislodged from woven and knit fabric/textile structures by the mechanical action of laundering. These dislodged fibers may from lint, fuzz or "pills" which are visible on the surface of fabrics and diminish the appearance of newness of the fabric. Further, repeated laundering of fabrics and textiles, especially with bleach-containing laundry products, can remove dye from fabrics and textiles and impart a faded, worn out appearance as a result of diminished color intensity, and in many cases, as a result of changes in hues or shades of color.

Given the foregoing, there is clearly an ongoing need to identify materials which could be added to laundry detergent products that would associate themselves with the fibers of the fabrics and textiles laundered using such detergent products and thereby reduce or minimize the tendency of the laundered fabric/textiles to deteriorate in appearance. Any such detergent product additive material should, of course, be able to benefit fabric appearance and integrity without unduly interfering with the ability of the laundry detergent to perform its fabric cleaning function. The present invention is directed to the use of cyclic amine based polymer, oligomer or copolymer materials in laundry applications which perform in this desired manner.

SUMMARY OF THE INVENTION

Cyclic amine based polymer, oligomer or copolymer materials which are suitable for use in laundry operations and provide the desired fabric appearance and integrity benefits can be characterized by the following general formula:

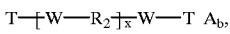

wherein;

each T is independently selected from the group consisting of H, $C_1$–$C_{12}$ alkyl, substituted alkyl, $C_7$–$C_{12}$ alkylaryl,

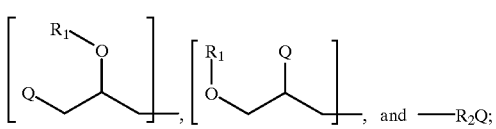

wherein W comprises at least one cyclic constituent selected from the group consisting of:

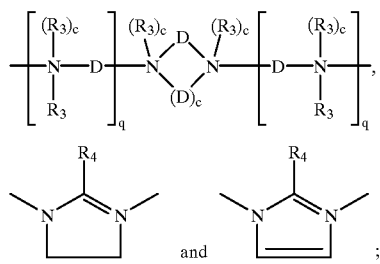

in addition to the at least one cyclic constituent, W may also comprise an aliphatic or substituted aliphatic moiety of the general structure;

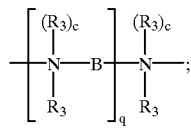

each B is independently $C_1$–$C_{12}$ alkylene, $C_1$–$C_{12}$ substituted alkylene, $C_3$–$C_{12}$ alkenylene, $C_8$–$C_{12}$ dialkylarylene, $C_8$–$C_{12}$ dialkylarylenediyl, and —$(R_5O)_nR_5$—;

each D is independently $C_2$–$C_6$ alkylene;

each Q is independently selected from the group consisting of hydroxy, $C_1$–$C_{18}$ alkoxy, $C_2$–$C_{18}$ hydroxyalkoxy, amino, $C_1$–$C_{18}$ alkylamino, dialkylamino, trialkylamino groups, heterocyclic monoamino groups and diamino groups;

each $R_1$ is independently selected from the group consisting of H, $C_1$–$C_8$ alkyl and $C_1$–$C_8$ hydroxyalkyl;

each $R_2$ is independently selected from the group consisting of $C_1$–$C_{12}$ alkylene, $C_1$–$C_{12}$ alkenylene, —$CH_2$—$CH(OR_1)$—$CH_2$, $C_8$–$C_{12}$ alkarylene, $C_4$–$C_{12}$ dihydroxyalkylene, poly($C_2$–$C_4$ alkyleneoxy)alkylene, $H_2CH(OH)CH_2OR_2OCH_2CH(OH)CH_2$—, and $C_3$–$C_{12}$ hydrocarbyl moieties;

provided that when $R_2$ is a $C_3$–$C_{12}$ hydrocarbyl moiety the hydrocarbyl moiety can comprise from about 2 to about 4 branching moieties of the general structure:

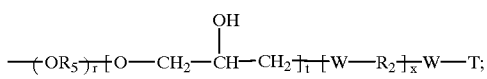

$$-(-OR_5-)_{\overline{r}}[O-CH_2-CH(OH)-CH_2-]_{\overline{h}}[W-R_2-]_{\overline{x}}W-T;$$

each $R_3$ is independently selected from the group consisting of H, $R_2$, $C_1$–$C_{20}$ hydroxyalkyl, $C_1$–$C_{20}$ alkyl, substituted alkyl, $C_6$–$C_{11}$ aryl, substituted aryl, $C_7$–$C_{11}$ alkylaryl, and $C_1$–$C_{20}$ aminoalkyl;

each $R_4$ is independently selected from the group consisting of H, $C_1$–$C_{22}$ alkyl, $C_1$–$C_{22}$ hydroxyalkyl, aryl and $C_7$–$C_{22}$ alkylaryl;

each $R_5$ is independently selected from the group consisting of $C_2$–$C_8$ alkylene, $C_2$–$C_8$ alkyl substituted alkylene; and A is a compatible monovalent or di or polyvalent anion;

M is a compatible cation;

b=number necessary to balance the charge;

each x is independently from 3 to about 1000;

each c is independently 0 or 1;

each h is independently from about 0 to about 8;

each q is independently from 0 to about 6;

each n is independently from 0 to about 20;

each r is independently from 0 to about 20; and each t is independently from 0 to 1.

The cyclic amine based polymer, oligomer or copolymer materials defined above can be used as a washing solution additive in either granular or liquid form. Alternatively, they can be admixed to granular detergents, dissolved in liquid detergent compositions or added to a fabric softening composition. The forgoing description of used for the cyclic amine based fabric treatment materials defined herein are intended to be exemplary and other used will be apparent to those skilled in the art and are intended to be within the scope of the present invention.

The laundry detergent compositions herein comprise from about 1% to 80% by weight of a detersive surfactant, from about 0.01% to 80% by weight of and organic or inorganic detergency builder and from about 0.01% to 5% by weight of the cyclic amine based fabric treatment materials of the present invention. The detersive surfactant and detergency builder materials can be any of those useful in conventional laundry detergents products.

Aqueous solutions of the cyclic amine based polymer, oligomer or copolymer materials of the subject invention comprise from about 0.01T to 80% by weight of the cyclic amine based fabric treatment materials dissolved in water and other ingredients such as stabilizers and pH adjusters.

In its method aspect, the present invention relates to the laundering or treating of fabrics and textiles in aqueous washing or treating solutions formed from effective amounts of the detergent compositions described herein, or formed from the individual components of such compositions. Laundering of fabrics and textiles in such washing solutions, followed by rinsing and drying, imparts fabric appearance benefits to the fabric and textile articles so treated. Such benefits can include improved overall appearance, pill/fuzz reduction, antifading, improved abrasion resistance, and/or enhanced softness.

DETAILED DESCRIPTION OF THE INVENTION

As noted, when fabric or textiled are laundered in wash solutions which comprise the cyclic amine based polymer, oligomer or copolymer materials of the present invention fabric appearance and integrity are enhanced. The cyclic amine based fabric treatment materials can be added to wash solutions by incorporating them into a detergent composition, a fabric softener or by adding them separately to the washing solution. The cyclic amine based fabric treatment materials are described herein primarily as liquid or granular detergent additives but the present invention is not meant to be so limited. The cyclic amine based fabric treatment materials, detergent composition components, optional ingredients for such compositions and methods of using such compositions, are described in detail below. All percentages are by weight unless other specified.

A) Cyclic amine Based Polymer, Oligomer or Copolymer Materials

The essential component of the compositions of the present invention comprises one or more cyclic amine based polymer, oligomer or copolymer. Such materials have been found to impart a number of appearance benefits to fabrics and textiles laundered in aqueous washing solutions formed from detergent compositions which contain such cyclic amine based fabric treatment materials. Such fabric appearance benefits can include, for example, improved overall appearance of the laundered fabrics, reductions of the formation of pills and fuzz, protection against color fading, improved abrasion resistance, etc. The cyclic amine based fabric treatment materials used in the compositions and methods herein can provide such fabric appearance benefits with acceptably little or no loss in cleaning performance provided by the laundry detergent compositions into which such materials are incorporated.

The cyclic amine based polymer, oligomer or copolymer component of the compositions herein may comprise combination of these cyclic amine based materials. For example, a mixture of piperadine and epihalohydrin condensates can be combined with a mixture of morpholine and epihalohydrin condensates to achieve the desired fabric treatment results. Moreover, the molecular weight of cyclic amine based fabric treatment materials can vary within the mixture as is illustrated in the Examples below.

As will be apparent to those skilled in the art, an oligomer is a molecule consisting of only a few monomer units while polymers comprise considerably more monomer units. For the present invention, oligomers are defined as molecules having an average molecular weight below about 1,000 and polymers are molecules having an average molecular weight of grater than about 1,000. Copolymers are polymers or oligomers wherein two or more dissimilar monomers have been simultaneously or sequentially polymerized. Copolymers of the present invention can include, for example, polymers or oligomers polymerized from a mixture of a primary cyclic amine based monomer, e.g., piperadine, and a secondary cyclic amine monomer, e.g., morpholine.

The cyclic amine based fabric treatment component of the detergent compositions herein will generally comprise from about 0.01% to about 5% by the weight of the detergent composition. More preferably, such cyclic amine based fabric treatment materials will comprise from about 0.1% to about 4% by weight of the detergent compositions, most preferably from about 0.75% to about 3%. However, as discussed above, when used as a washing solution additive, i.e. when the cyclic amine based fabric treatment component is not incorporated into a detergent composition, the concentration of the cyclic amine based component can comprise from about 0.1% to about 80% by weight of the additive material.

One suitable group of cyclic amine based polymer, oligomer or copolymer materials for use herein is characterized by the following formula:

Cyclic amine based polymer, oligomer or copolymer materials which are suitable for use in laundry operations and provide the desired fabric appearance and integrity benefits can be characterized by the general given in the Summary of the Invention. Preferred compounds that fall within this general structure include compounds:

wherein each $R_1$ is H; and
at least one W is selected from the group consisting of:

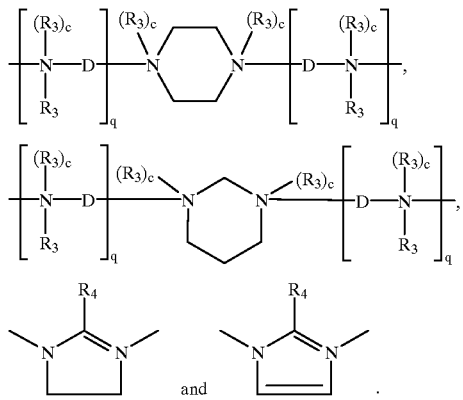

Even more preferred compounds for the fabric appearance and integrity benefits are those:
wherein each $R_1$ is H; and
at least one W is selected from the group consisting of:

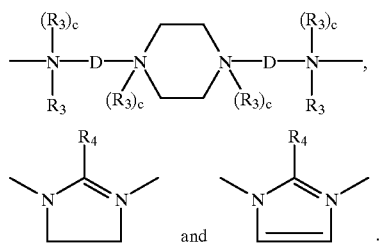

And most preferred compounds for the fabric appearance and integrity benefits are those:
wherein each $R_1$ is H; and
at least one W is selected from the group consisting of:

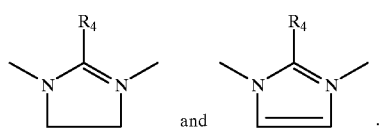

Preferred compounds to be used as the linking group $R_2$ include, but are not limited to: polyepoxides, ethylenecarbonate, propylenecarbonate, urea, α, β-unsaturated carboxylic acids, esters of α, β-unsaturated carboxylic acids, amides of α, β-unsaturated carboxylic acids, anhydrides of α, β-unsaturated carboxylic acids, di- or polycarboxylic acids, esters of di- or polycarboxylic acids, amides of di- or polycarboxylic acids anhydrides of di- or polycarboxylic acids, glycidylhalogens, chloroformic esters, chloroacetic esters, derivatives of chloroformic esters, derivatives of chloroacetic esters, epihalohydrins, glycerol dichlorohydrins, bis-(halohydrins), polyetherdihalocompounds, phosgene, polyhalogens, functionalized glycidyl ethers and mixtures thereof. Moreover, $R_2$ can also comprise a reaction product formed by reacting one or more of polyetherdiamines, alkylenediamines, polyalkylenepolyamines, alcohols, alkyleneglycols and polyalkyleneglycols with α, β-unsaturated carboxylic acids, ester of α, β-unsaturated carboxylic acids, amides of α, β-unsaturated carboxylic acids and anhydrides of α, β-unsaturated carboxylic acids provided that the reaction products contain at least two double bonds, two carboxylic groups, two amide groups or two ester groups.

Additionally preferred cyclic amine based polymer, oligomer or copolymer materials for use herein include adducts of two or more compositions selected from the group consisting of: piperzine, piperadine, epichlorohydrin, epichlorohydrin benzyl quat, epichlorohydrin methyl quat, morpholine and mixtures thereof.

These cyclic amine based polymers can be linear or branched. One specific type of branching can be intorduced using a polyfunctional crosslinking agent. An example of such such polymer is exemplified below.

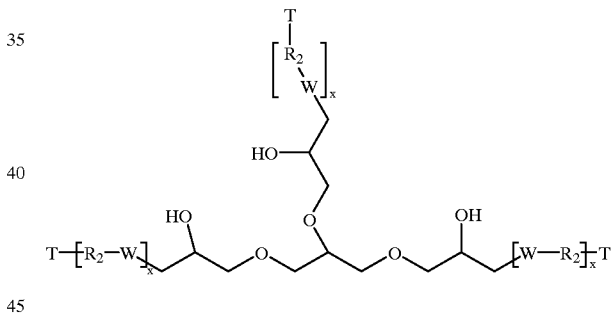

B) Detersive Surfactant

The detergent compositions herein comprise from about 1% to 80% by weight of a detersive surfactant. Preferably such compositions comprise from about 5% to 50% by weight of surfactant. Detersive surfactants utilized can be of the anionic, nonionic, zwitterionic, ampholytic or cationic type or can comprise compatible mixtures of these types. Detergent surfactants useful herein are described in U.S. Pat. No. 3,664,961, Norris, issued May 23, 1972, U.S. Pat. No. 3,919,678, Laughlin et al., issued Dec. 30, 1975, U.S. Pat. No. 4,222,905, Cockrell, issued Sep. 16, 1980, and in U.S. Pat. No. 4,239,659, Murphy, issued Dec. 16, 1980. All of these patents are incorporated herein by reference. Of all the surfactants, anionics and nonionics are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are a) the sodium, potassium and ammonium alkyl sulfates, especially those obtained by sulfating the higher alcohols ($C_8$–$C_{18}$ carbon atoms) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzenes sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11\text{-}13}$LAS.

Preferred nonionic surfactants are those of the formula $R_1(OC_2H_4)_nOH$, wherein $R_1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$C_{13}$ alcohol condensed with about 6.5 moles of ethylene oxide per mole of alcohol.

Additional suitable nonionic surfactants include polyhydroxy fatty acid amides of the formula:

wherein R is a $C_{9\text{-}17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798, the disclosures of which are incorporated herein by reference.

Preferred surfactants for use in the detergent compositions described herein are amine based surfactants of the general formula:

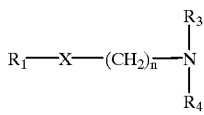

wherein $R_1$ is a $C_6$–$C_{12}$ alkyl group; n is from about 2 to about 4, X is a bridging group which is selected from NH, CONH, COO, or O or X can be absent; and $R_3$ and $R_4$ are individually selected from H, $C_1$–$C_4$ alkyl, or ($CH_2$—$CH_2$—$O(R_5)$) wherein $R_5$ is H or methyl. Especially preferred amines based surfactants include the following:

$R_1$—$(CH_2)_2$—$NH_2$ $R_1$—$O$—$(CH_2)_3$—$NH_2$ $R_1$—$C(O)$—$NH$—$(CH_2)_3$—$N(CH_3)_2$

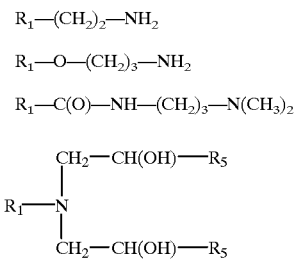

wherein $R_1$ is a $C_6$–$C_{12}$ alkyl group and $R_5$ is H or $CH_3$. Particularly preferred amines for use in the surfactants defined above include those selected from the group consisting of octyl amine, hexyl amine, decyl amine, dodecyl amine, $C_8$–$C_{12}$ bis(hydroxyethyl)amine, $C_8$–$C_{12}$ bis(hydroxyisopropyl)amine, $C_8$–$C_{12}$ amido-propyl dimethyl amine, or mixtures thereof.

In a highly preferred embodiment, the amine based surfactant is described by the formula:

$R_1$—$C(O)$—$NH$—$(CH_2)_3$—$N(CH_3)_2$ wherein $R_1$ is $C_8$–$C_{12}$ alkyl.

C) Detergent Builder

The detergent compositions herein may also comprise from about 0.1% to 80% by weight of a detergent builder. Preferably such compositions in liquid form will comprise from about 1% to 10% by weight of the builder component. Preferably such compositions in granular form will comprise from about 1% to 50% by weight of the builder component. Detergent builders are well known in the art and can comprise, for example, phosphate salts as well as various organic and inorganic nonphosphorus builders.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. Particularly preferred polycarboxylate builders are the oxydisuccinates and the ether carboxylate builder compositions comprising a combination of tartrate monosuccinate and tartrate disuccinate described in U.S. Pat. No.

4,663,071, Bush et al., issued May 5, 1987, the disclosure of which is incorporated herein by reference.

Examples of suitable nonphosphorus, inorganic builders include the silicates, aluminosilicates, borates and carbonates. Particularly preferred are sodium and potassium carbonate, bicarbonate, sesquicarbonate, tetraborate decahydrate, and silicates having a weight ration of $SiO_2$ to alkali metal oxide of from about 0.5 to about 4.0, preferably from about 1.0 to about 2.4. Also preferred are aluminosilicates including zeolites. Such materials and their use as detergent builders are more fully discussed in Corkill et al., U.S. Pat. No. 4,605,509, the disclosure of which is incorporated herein by reference. Also discussed in U.S. Pat. No. 4,605,509 are crystalline layered silicates which are suitable for use in the detergent compositions of this invention.

D) Optional Detergent Ingredients

In addition to the surfactants, builders and cyclic amine based polymer, oligomer or copolymer materials hereinbefore described, the detergent compositions of the present invention can also include any number of additional optional ingredients. These include conventional detergent composition components such as enzymes and enzyme stabilizing agents, suds boosters or suds suppressers, anti-tarnish and anticorrosion agents, bleaching agents, soil suspending agents, soil release agents, germicides, pH adjusting agents, non-builder alkalinity sources, chelating agents, organic and inorganic fillers, solvents, hydrotropes, optical brighteners, dyes and perfumes.

pH adjusting agents may be necessary in certain applications where the pH of the wash solution is greater than about 10.0 because the fabric integrity benefits of the defined compositions begin to diminish at a higher pH. Hence, if the wash solution is greater than about 10.0 after the addition of the cyclic amine based polymer, oligomer or copolymer materials of the present invention a pH adjuster should be used to reduce the pH of the washing solution to below about 10.0, preferably to a pH of below about 9.5 and most preferably below about 7.5. Suitable pH adjusters will be known to those skilled in the art.

A preferred optional ingredients for incorporation into the detergent compositions herein comprises a bleaching agent, e.g., a peroxygen bleach. Such peroxygen bleaching agents may be organic or inorganic in nature. Inorganic peroxygen bleaching agents are frequently utilized in combination with a bleach activator.

Useful organic peroxygen bleaching agents include percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781, Hartman, Issued Nov. 20, 1984; European Patent Application EP-A-133,354, Banks et al., Published Feb. 20, 1985; and U.S. Pat. No. 4,412,934, Chung et al., Issued Nov. 1, 1983. Highly preferred bleaching agents also include 6-nonylamino-6-oxoperoxycaproic acid (NAPAA) as described in U.S. Pat. No. 4,634,551 Issued Jan. 6, 1987 to Burns et al.

Inorganic peroxygen bleaching agents may also be used, generally in particulate form, in the detergent compositions herein. Inorganic bleaching agents are in fact preferred. Such inorganic peroxygen compounds include alkali metal perborate and percarbonate materials. For example, sodium perborate (e.g., mono- or tetra-hydrate) can be used. Suitable inorganic bleaching agents can also include sodium or potassium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used. Frequently inorganic peroxygen bleaches will be coated with silicate, borate, sulfate or water-soluble surfactants. For example, coated percarbonate particles are available from various commercial sources such as FMC, Solvay Interox, Tokai Denka and Degussa.

Inorganic peroxygen bleaching agents, e.g., the perborates, the percarbonates, etc., are preferably combined with bleach activators, which lead to the in situ productions in aqueous solution (i.e., during use of the compositions herein for fabric laundering/bleaching) of the peroxy acid corresponding to the bleach activator. Various non-limiting examples of activators are disclosed in U.S. Pat. No. 4,915,854, Issued Apr. 10, 1990 to Mao et al., and U.S. Pat. No. 4,412,934 Issued Nov. 1, 1983 to Chung et a., The nonanoyloxybenzene sulfonate (NOBS) and tetraacetyl ethylene diamine (TAED) activators are typical and preferred. Mixtures thereof can also be used. See also the hereinbefore referenced U.S. Pat. No. 4,634,551 for other typical bleaches and activators useful herein.

Other useful amido-derived bleach activators are those of the formulae:

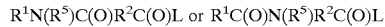

wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydrolysis anion. A preferred leaving group is phenol sulfate.

Preferred examples of bleach activators of the above formulae include (6-octanamidocaproyl) oxybenzenesulfone, (6-nonanamidocaproyl) oxybenzenesul-fonate, (6-decanamidocaproyl)oxybenzenesulfonate and mixtures thereof as described in the hereinbefore references U.S. Pat. No. 4,634,551.

Another class of useful bleach activators comprises the benzoxazin-type activators disclosed by Hodge et al. in U.S. Pat. No. 4,966,723, Issued Oct. 30, 1990, incorporated herein by reference. A highly preferred activator of the benzoxazin-type is:

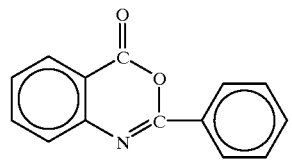

Still another class of useful bleach activators includes the acyl lactam activators, especially acyl caprolactams and acyl valerolactams of the formulae:

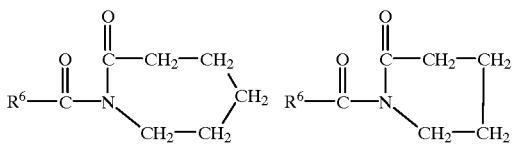

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5,-trimethylhexanoyl caprolactam, nonanoyl caprolactam, decanoyl caprolactam, undecenoyl caprolactam, benzoyl valerolactam, octanoyl valerolactam, nonanoyl valerolactam, decanoyl valerolactam, undecenoyl valerolactam, 3,5,5-trimethylhexanoyl valerolactam and mixtures thereof. See also U.S. Pat. No. 4,545,784, Issued to Sanderson, Oct. 8, 1985, incorporated herein by reference, which discloses acyl caprolactams, including benzoyl caprolactam, adsorbed into sodium perborate.

If utilized, peroxygen bleaching agent will generally comprise from about 2% to 30% by weight of the detergent compositions herein. More preferably, peroxygen bleaching agent will comprise from about 2% to 20% by weight of the compositions. Most preferably, peroxygen bleaching agent will be present to the extent of from about 3% to 15% by weight of the compositions herein. If utilized, bleach activators can comprise from about 2% to 10% by weight of the detergent compositions herein. Frequently, activators are employed such that the molar ratio of bleaching agent to activator ranges from about 1:1 to 10:1, more preferably from about 1.5:1 to 5:1. Another highly preferred optional ingredient in the detergent compositions herein is a detersive enzyme component. Enzymes can be included in the present detergent compositions for a variety of purposes, including removal of protein-based, carbohydrate-based, or triglyceride-based stains from substrates, for the prevention of refugee dye transfer in fabric laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability, optimal thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry detergent composition. Preferred enzymes for laundry purposes include, but are not limited to, proteases, cellulases, lipases, amylases and peroxidases.

Enzymes are normally incorporated into detergent compositions at levels sufficient to provide a "cleaning-effective amount". The term "cleaning-effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may be desirable in highly concentrated detergent formulations.

Suitable example of proteases are the subtilisins which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International BioSynthetics, Inc., The Netherlands; as well as Protease A as disclosed in EP 130,756 A Jan. 9, 1985 and Protease B as disclosed in EP 303,761 A, Apr. 28, 1987 and EP 130,756 A, Jan. 9, 1985. See also a high pH protease from *Bacillus sp.* NCIMB 40338 described in WO 9318140 A to Novo. Enzymatic detergents comprising protease, one or more other enzymes, and a reversible protease inhibitor are described in WO 9203529 A to Novo. Other preferred proteases include those of WO 9510591 A to Procter & Gamble. When desired, a protease having decreased adsorption and increased hydrolysis is available to described in WO 9507791 to Procter & Gamble. A recombinant trypsin-like protease for detergents suitable herein is described in WO 9425583 to Novo.

Cellulases usable herein include both bacterial and fungal types, preferably having a pH optimum between 5 and 10. U.S. Pat. No. 4,435,307, Barbesgoard et al., Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® and CELLUZYME® (Novo) are especially useful. See also WO 9117243 to Novo.

Suitable lipase enzymes for detergent usage include those produced by microorganisms of the Pseudomonas group, such as *Pseudomonas stutzeri* ATCC 19.154, as disclosed in GB 1,372,034. See also, the lipase Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex *Chromobacter viscosum*, e.g., *Chromobacter viscosum var. lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPOLASE® enzyme derived from *Humicola lanuginosa* and commercially available from Novo, see also EP 341,947, is a preferred lipase for use herein.

The enzyme-containing compositions herein may optionally also comprise from about 0.001% to about 10%, preferably from about 0.005% to about 8%, most preferably from about 0.01% to about 6%, by weight of an enzyme stabilizing system. The enzyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

E) Detergent Composition Preparation

The detergent compositions according to the present invention can be in liquid, paste or granular form. Such compositions can be prepared by combining the essential and optional components in the requisite concentrations in any suitable order and by any conventional means.

Granular compositions, for example, are generally made by combining base granule ingredients, e.g., surfactants, builders, water, etc., as a slurry, and spray drying the resulting slurry to a low level of residual moisture (5–12%). The remaining dry ingredients, e.g., granules of the essential cyclic amine based fabric treatment materials, can be admixed in granular powder form with the spray dried granules in a rotary mixing drum. The liquid ingredients, e.g., solutions of the essential cyclic amine based fabric treatment materials, enzymes, binders and perfumes, can be sprayed onto the resulting granules to form the finished detergent composition. Granular compositions according to the present invention can also be in "compact form", i.e. they may have a relatively higher density can conventional granular detergents, i.e. from 550 to 950 g/l. In such case, the granular detergent compositions according to the present invention will contain a lower amount of "inorganic filler salt", compared to conventional granular detergents, typical filler salts are alkaline earth metal salts of sulphates and chlorides, typically sodium sulphate; "compact" detergents typically comprise not more than 10% filler salt.

Liquid detergent compositions can be prepared by admixing the essential and optional ingredients thereof in any desired order to provide compositions containing components in the requisite concentrations. Liquid compositions according to the present invention can also be in "compact form", in such case, the liquid detergent compositions according to the present invention will contain a lower amount of water, compared to conventional liquid detergents. Addition of the cyclic amine based polymer, oligomer or copolymer materials to liquid detergent or other aqueous compositions of this invention may be accomplished by simply mixing into the liquid solutions the desired cyclic amine based fabric treatment materials.

F) Fabric Laundering Method

The present invention also provides a method for laundering fabrics in a manner which imparts fabric appearance benefits provided by the cyclic amine based polymer, oligomer or copolymer materials used herein. Such a method employs contacting these fabrics with an aqueous washing solution formed from an effective amount of the detergent compositions hereinbefore described or formed from the individual components of such compositions. Contacting of fabrics with washing solution will generally occur under conditions of agitation although the compositions of the present invention may also be used to form aqueous unagitated soaking solutions for fabric cleaning and treatment. As discussed above, it is preferred that the washing solution have a pH of less than about 10.0, preferably it has a pH of about 9.5 and most preferably it has a pH of about 7.5.

Agitation is preferably provided in a washing machine for good cleaning. Washing is preferably followed by drying the wet fabric in a conventional clothes dryer. An effective amount of a high density liquid or granular detergent composition in the aqueous wash solution in the washing machine is preferably from about 500 to about 7000 ppm, more preferably from about 1000 to about 3000 ppm.

G) Fabric Conditioning and Softening

The cyclic amine based polymer, oligomer and copolymer materials hereinbefore described as components of the laundry detergent compositions herein may also be used to treat and condition fabrics and textiles in the absence of the surfactant and builder components of the detergent composition embodiments of this invention. Thus, for example, a fabric conditioning composition comprising only the cyclic amine based fabric treatment materials, may be added during the rinse cycle of a conventional home laundering operation in order to impart the desired fabric appearance and integrity benefits hereinbefore described.

The compositions of the present invention comprise at least about 1%, preferably from about 10%, more preferably from about 20% to about 80%, more preferably to about 60% by weight, of the composition of one or more fabric softener actives.

The preferred fabric softening actives according to the present invention are amines having the formula:

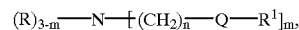

quaternary ammonium compounds having the formula:

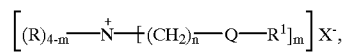

and mixtures thereof, wherein each R is independently $C_1$–$C_6$ alkyl, $C_1$–$C_6$ hydroxyalkyl, benzyl, and mixtures thereof; $R^1$ is preferably $C_{11}$–$C_{22}$ linear alkyl, $C_{11}$–$C_{22}$ branched alkyl, $C_{11}$–$C_{22}$ linear alkenyl, $C_{11}$–$C_{22}$ branched alkenyl, and mixtures thereof; Q is a carbonyl moiety independently selected from the units having the formula:

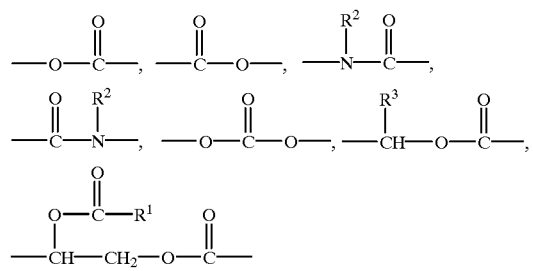

wherein $R^2$ is hydrogen, $C_1$–$C_4$ alkyl, preferably hydrogen; $R^3$ $C_1$–$C_4$ alkyl, preferably hydrogen or methyl; preferably Q has the formula:

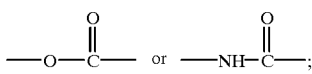

X is a softener compatible anion, preferably the anion of a strong acid, for example, chloride bromide, methylsulfate, ethylsulfate, sulfate, nitrate and mixtures thereof, more preferably chloride and methyl sulfate. The anion can also, but less preferably, carry a double charge, in which case $X^{(-)}$ represents half a group. The index m has a value of from 1 to 3; the index n has a value of from 1 to 4, preferably 2 or 3, more preferably 2.

One embodiment of the present invention provides for amines and quaternized amines having two or more difference values for the index n per molecule, for example, a softener active prepared from the starting amine methyl(3-aminopropyl)(2-hydroxyethyl)amine.

More preferred softener actives according to the present invention have the formula:

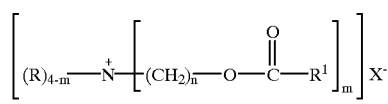

wherein the unit having the formula:

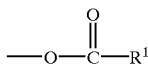

is a fatty acyl moiety. Suitable fatty acyl moieties for use in the softener actives of the present invention are derived from sources of triglycerides including tallow, vegetable oils and/or partially hydrogenated vegetable oils including inter alia canola oil, safflower oil, peanut oil, sunflower oil, corn oil, soybean oil, tall oil, rice bran oil. Yet more preferred are the Diester Quaternary Ammonium Compounds (DEQA's) wherein the index m is equal to 2. The $R^1$ units are typically mixtures of linear and branched chains of both saturated and unsaturated aliphatic fatty acids.

The formulator, depending upon the desired physical and performance properties of the final fabric softener active, can choose any of the above mentioned sources of fatty acyl moieties, or alternatively, the formulator can mix sources of triglyceride to form a "customized blend". However, those skilled in the art of fats and oils recognize that the fatty acyl composition may vary, as in the case of vegetable oil, from crop to crop, or from variety of vegetable oil source to variety of vegetable oil source. DEQA's which are prepared using fatty acids derived from natural sources are preferred.

A preferred embodiment of the present invention provides softener actives comprising $R^1$ units which have at least 3%, preferably at least about 5%, more preferably at least about 10%, most preferably at least 15% $C_{11}$–$C_{22}$ alkenyl, including polyalkenyl (polyunsaturated) units inter alia oleic, linoleic, linolenic.

For the purposes of the present invention the term "mixed chain fatty acyl units" is defined as "a mixture of fatty acyl units comprising alkyl and alkenyl chains having from 10 carbons to 22 carbon atoms including the carbonyl carbon atom, and in the case of alkenyl chains, from one to three double bonds, preferably all double bonds in the cis configuration". With regard to the $R^1$ units of the present invention, it is preferred that at least a substantial percentage of the fatty acyl groups are unsaturated, e.g., from about 25%, preferably from about 50% to about 70%, preferably to about 65%. The total level of fabric softening active containing polyunsaturated fatty acyl groups can be from about 3%, preferably from about 5%, more preferably from about 10% to about 30%, preferably to about 25%, more preferably to about 18%. As stated herein above cis and trans isomers can be used, preferably with a cis/trans ratio is of from 1:1, preferably at least 3:1, and more preferably from about 4:1 to about 50:1, more preferably about 20:1, however, the minimum being 1:1.

The level of unsaturation contained within the tallow, canola, or other fatty acyl unit chain can be measured by the Iodine Value (IV) of the corresponding fatty acid, which in the present case should preferably be in the range of from 5 to 100 with two categories of compounds being distinguished, having a IV below or above 25.

Indeed, for compounds having the formula:

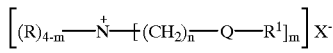

derived from tallow fatty acids, when the Iodine Value is from 5 to 25, preferably 15 to 20, it has been found that a cis/trans isomer weight ratio greater than about 30/70, preferably greater than about 50/50 and more preferably greater than about 70/30 provides optimal concentrability.

For compounds of this type made from tallow fatty acids having a Iodine Value of above 25, the ratio of cis to trans isomers has been found to be less critical unless very high concentrations are needed. A further preferred embodiment of the present invention comprises DEQA's wherein the average Iodine Value for $R^1$ is approximately 45.

The $R^1$ units suitable for use in the isotropic liquids present invention can be further characterized in that the Iodine Value (IV) of the parent fatty acid, said IV is preferably from about 10, more preferably from about 50, most preferably from about 70, to a value of about 140, preferably to about 130, more preferably to about 115. However, formulators, depending upon which embodiment of the present invention they choose to execute, may wish to add an amount of fatty acyl units which have Iodine Values outside the range listed herein above. For example, "hardened stock" (IV less than or equal to about 10) may be combined with the source of fatty acid admixture to adjust the properties of the final softener active.

A preferred source of fatty acyl units, especially fatty acyl units having branching, for example, "Guerbet branching", methyl, ethyl, etc. units substituted along the primary alkyl chain, synthetic sources of fatty acyl units are also suitable. For example, the formulator may with to add one or more fatty acyl units having a methyl branch at a "non-naturally occurring" position, for example, at the third carbon of a $C_{17}$ chain. What is meant herein by the term "non-naturally occurring" is "acyl units which are not found in significant (greater than about 0.1%) quantities is common fats and oils which serve a feedstocks for the source of triglycerides described herein." If the desired branched chain fatty acyl unit is unavailable from readily available natural feedstocks, therefore, synthetic fatty acid can be suitably admixed with other synthetic materials or with other natural triglyceride derived sources of acyl units.

Additional fabric softening agents useful herein are described in U.S. Pat. No. 5,643,865 Mermelstein et al., issued Jul. 1, 1997; U.S. Pat. No. 5,622,925 de Buzzaccarini et al., issued Apr. 22, 1997; U.S. Pat. No. 5,545,350 Baker et al., issued Aug. 13, 1996; U.S. Pat. No. 5,474,690 Wahl et al., issued Dec. 12, 1995; U.S. Pat. No. 5,417,868 Turner et al., issued Jan. 27, 1994; U.S. Pat. No. 4,661,269 Trinh et a., issued Apr. 28, 1987; U.S. Pat. No. 4,439,335 Burns, issued Mar. 27, 1984; U.S. Pat. No. 4,401,578 Verburggen, issued Aug. 30, 1983; U.S. Pat. No. 4,308,151 Cambre, issued Dec. 29, 1981; U.S. Pat. No. 4,237,016 Rudkin et al., issued Oct. 27, 1978; U.S. Pat. No. 4,233,164 Davis, issued Nov. 11, 1980; U.S. Pat. No. 4,045,361 Watt et al., issued Aug. 30, 1997; U.S. Pat. No. 3,974,076 Wiersema et al., issued Aug. 10, 1976; U.S. Pat. No. 3,886,075 Bernadino, issued May 6, 1975; U.S. Pat. No. 3,861,870 Edwards et al., issued Jan. 21, 1975; and European Patent Application publication No. 472,178, by Yamamura et a., all of said documents being incorporated herein by reference.

EXAMPLES

The following example illustrate the compositions and methods of the present invention, but is not necessarily meant to limit or otherwise define the scope of the invention.

EXAMPLE 1
Synthesis of the adduct of imidazole and epichlorohydin (Ratio of imidazole:epichlorohydrin 1:1)

The polycationic condensate is prepared by reacting imidazole and epichlorohydrin. To a round bottomed flask equipped with a magnatic stirrer, condenser and a thermometer are added imidazole (0.68 moles) and 95 mL water. The solution is heated to 50° C. followed by dropwise addition of epichlorohydrin (0.68 moles). After all the epichlorohydrin is added, the temperature is raised to 80° C. until all the alkylating agent is consumed. The condensate produced had molecular weight of about 12,500.

EXAMPLE 2
Synthesis of the adduct of imidazole and epichlorohydin (Ratio of imidazole:epichlorohydrin 1.4:1)

To a round bottomed flask equipped with a magnatic stirrer, condenser and a thermometer are added imidazole (0.68 moles) and 95 mL water. The solution is heated to 50° C. followed by dropwise addition of epichlorohydrin (0.50 moles). After all the epichlorohydrin is added, the temperature is raised to 80° C. until all the alkylating agent is consumed. The condensate produced had molecular weight of about 2000.

EXAMPLE 3
Synthesis of the adduct of piperazine, morpholine and epichlorohydin (Ratio 1.8/0.8/2.0)

Into a round bottom flask equipped with stirrer, thermometer, dropping funnel and reflux condenser were weighed 154.8 g (1.8 mole) of piperazine and 69.6 g (0.8 mole) of morpholine and 220 ml of water. After a clear solution at 40° C. was obtained, the solution was heated to 55–65° C. and with vigorous stirring 185 g (2 mole) of epichlorohydrin were added at such a rate, that the temperature did not exceed 80° C. After all the epichlorohydrin had been added the reaction mixture was heated to 85° C. until all of the alkylating agents had been consumed (negative Preussmann test after 4 hours). 108.8 g (0.68 mole) of 25% NaOH and 40 g of water were added and the reaction mixture was stirred for another hour at 85° C. Then additional 47 g of water were added and the mixture was allowed to cool to room temperature.

EXAMPLE 4
Synthesis of the adduct of piperazine and epichlorohydin (Ratio of imidazole:epichlorohydrin 1:1)

To a round bottomed flask equipped with a magnatic stirrer, condenser and a thermometer are added piperazine (0.68 moles and 95 mL water. The solution is heated to 50° C. followed by dropwise addition of epichlorohydrin (0.68 moles). After all the epichlorohydrin is added, the temperature is raised to 80° C. until all the alkylating agent is consumed.

EXAMPLE 5
To the condensate in example 4 are added 1.4 mole equivalent of methyl chloride based on piperazine and mixed until all the methyl chloride is consumed.

EXAMPLE 6
Synthesis of the adduct of imidazole, piperazine and epichlorohydin (Ratio of imidazole:piperazine:epichlorohydrin=1:3:4)

68.8 g (1.0 mole) of limidazole and 260.6 g (3.0 mole) of piperazine were solved in 700.2 g of water and at a temperature of 50–60° C. 370 g (4.0 mole) of epichlorohydrin were added dropwise. After the addition was complete, the reaction mixture was stirred for additional 5 hours at 80° C.

EXAMPLE 7
(a) Reaction of bis(aminopropyl)piperazine with epichlorohydrin in a molar ration of 2:1

600 g (3 moles) of bis(aminopropyl)piperazine were dissolved in 750 g of water. This solution was heated to 90° C. As soon as this temperature was reached 140.1 g (1.5 moles) of epichlorohydrin were added within 60 minutes at 90° C. The reaction mixture was then stirred at 90° C. for 150 minutes. Thereafter no epichlorohydrin could be detected. The condensation product contained NH groups.

(b) Permethylation of the condensation product obtained under (a)

99.7 g (content of NH groups was 0.87 moles) of the condensation product obtained according to (a) were mixed with 100.3 g (2.18 moles) of formic acid (99%) with stirring and cooling in an ice bath. 104.5 g (1.045 moles) of formaldehyde in the form of a 30% strength by weight aqueous solution were added in the course of 20 minutes at room temperature. The reaction mixture was then cautiously heated to 60° C. At about 50° C. the evolution of carbon dioxide from the reaction mixture began and became vigorous at 60° C. so that the heating could be removed. After the evolution of carbon dioxide had slowed down the reaction mixture was refluxed for 12 hours. After cooling 100 ml of concentrated hydrochloric acid were added and the water removed from the reaction mixture. 153.6 g of of solids were obtained and dissolved in water forming a 50% strength by weight solution of a cyclic amine based polymer substantially free of primary and secondary amino groups. As determined by 13C-NMR spectroscopy, more than 90% of the NH groups were converted into tertiary nitrogen atoms. The amount of quaternary ammonium groups in the polymer was below 5%. The aqueous polymer solution had a pH of 9.58. The k value of the polymer was 8.6.

EXAMPLE 8

(a) As described in Example 1 (a), 400 g (2 moles) of bis(aminopropyl)piperazine were dissolved in 520 g of water and condensed with 124.5 g (1.33 moles) of epichlorohydrin. The molar ration of bis(aminopropyl)piperazine to epichlorohydrin was 1.5:1.

(b) 36.5 g (content of NH groups was 0.181 moles) of the reaction product obtained according to (a) were mixed within 10 minutes with 20.8 g of formic acid (99%) with stirring and cooling in an ice bath. The reaction mixture was then heated to 70° C. As soon as this temperature was reached, 21.7 g (0.217 moles) of formaldehyde in the form of a 30% strength aqueous solution was added at 70–80° C. within 36 minutes to the reaction mixture. After the addition of two drops of a defoamer the reation mixture was refluxed for 17 hours. The polymer solution was cooled to room temperature and after the addition of 100 ml of concentrated hydrochloric acid the water was removed. A cyclic amine based polymer substantially free of primary and secondary amino groups was obtained. More than 90% of te original NH groups contained in the polymer were converted into tertiary nitrogen groups. The K value of the polymer was 11.1.

EXAMPLE 9

633 g (content of NH groups was 3.75 moles) of the condensation product of bis(aminopropyl)piperazine and epichlorohydrin in the molar ration 2:1 obtained according Example 1 (a) were mixed while stirring with 51.0 g (0.64 moles) of a 50% strength by weight aqueous solution of sodium hydroxide. The mixture was then heated in a pressure-tight closed autoclave to a temperature of 120° C. and reacted at this temperature with 165 g (3.75 moles) of ethylene oxide which was introduced into the autoclave within 45 minutes. The pressure in the autoclave is between 2 and 8 bar. The reaction mixture is then stirred for 1 hour at 120° C. and cooled to room temperature. Non-reacted ethylene oxide is removed with a stream of nitrogen. 830.5 g of a dark-colored liquid with a water content of 39.4% was obtained. The polymer had a K value of 12.7. More than 90% of the original NH groups were converted into tertiary amine N-hydroxyethyl substituted groups. The content of quaternary ammonium groups was below 5%.

EXAMPLE 10

290.3 g (content of NH groups was 1.59 moles) of the condensation product of bis(aminopropyl)piperazine and epichlorohydrin in the molar ration of 1.5:1 obtained according to Example 2 (a) were mixed while stirring with 19.7 g (0.37 moles) of a 50% strength by weight aqueous solution of sodium hydroxide. The mixture was then heated in a pressure-tight closed autoclave to 95° C. As soon as this temperature was reached, 70 g (1.59 moles) of ethylene oxide were introduced into the autoclave within 35 minutes at temperatures of from 95 to 111° C. and at a pressure of from 2 to 8 bar. The contents of the autoclave were then heated for 1 hour under stirring at 120° C. and cooled to room temperature. The non-reacted ethylene oxide was removed by passing a stream of nitrogen through the reaction mixture. 400 g of a dark-colored liquid having a water content of 38.3% were obtained. The polymer had a K value of 14.1. More than 90% of the original NH groups were converted into tertiary amine N-hydroxyethyl substituted groups. The polymer contained less than 5% quaternary ammonium groups.

EXAMPLE 11

Granular Detergent Test Composition Preparation

Several granular detergent compositions are prepared containing various cyclic amine based polymer, oligomer or copolymer materials. Such granular detergent compositions all have the following basic formula:

| Component | Example Wt. % | Comparative Wt % |
|---|---|---|
| Na $C_{12}$ Linear alkyl benzene sulfonate | 9.40 | 9.40 |
| Na $C_{14-15}$ alkyl sulfonate | 11.26 | 11.26 |
| Zeolite Builder | 27.79 | 27.79 |
| Sodium Carbonate | 27.31 | 27.31 |
| PEG 4000 | 1.60 | 1.60 |
| Dispersant, Na polyacrylate | 2.26 | 2.26 |
| $C_{12-13}$ alkyl ethoxylate (E9) | 1.5 | 1.5 |
| Sodium Perborate | 1.03 | 1.03 |
| Polymer/Oligomer shown in the table | level shown below | 0 |
| Other Adjunct ingredients | Balance 100% | Balance 100% |

TABLE 11

The chemical structures shown in the examples below are idealized structures. Side reactions expected to occur during the condensation are not shown.

| Example | Material | Level (wt %) |
|---|---|---|
| 6 | Adduct of Imidazole-epichlorohydrin (ratio of imidazole:epichlorohydrin 1:1, Polymer from Example 1) | 3.0 |

TABLE 11-continued

The chemical structures shown in the examples below are idealized structures. Side reactions expected to occur during the condensation are not shown.

| Example | Material | Level (wt %) |
|---|---|---|
| | 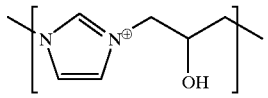<br>(Idealized Structure) | |
| 7 | Adduct of Imidazole-epichlorohydrin<br>(Ratio of imidazole:epichlorohydrin 1.36:1, Polymer from Example 2) | 0.8 |
| | 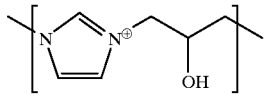<br>(Idealized Structure) | |
| 8 | Adduct of Imidazole-epichlorohydrin<br>Ratio of imidazole:epichlorohydrin 1.75:1) | 0.8 |
| | 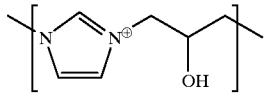<br>(Idealized Structure) | |
| 9 | Adduct of Imidazole-epichlorohydrin-trisglycidyl ether from glycerine<br>(Ratio of imidazole:epichlorohydrin:trisglycidylether<br>2.0:1.76:0.26) | 0.8 |
| | <br>Idealized Structure | |
| 10 | Adduct of Imidazole-epichlorohydrin- -trisglycidyl ether from glycerine(Ratio of imidazole:epichlorohydrin:-trisglycidyl ether from glycerine 2.0:1.9:0.1) | 0.8 |
| | 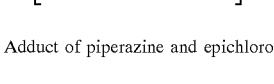 | |
| 11 | Adduct of piperazine and epichlorohydrin (ratio 1:1) | 0.8 |
| | 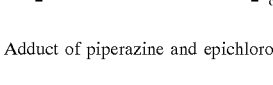 | |
| 12 | Adduct of piperazine and epichlorohydrin (ratio 1:1), benzyl quat | 0.8 |

TABLE 11-continued

The chemical structures shown in the examples below are idealized structures. Side reactions expected to occur during the condensation are not shown.

| Example | Material | Level (wt %) |
|---|---|---|
| | 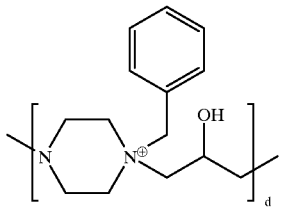 | |
| 13 | Adduct of piperazine and epichlorohydrin (ratio 1:1) methyl quat | 0.8 |
| | 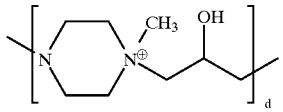 | |
| 14 | Adduct of piperazine, morpholine and epichlorohydrin (ratio 0.9:0.4:1.0) | |
| | 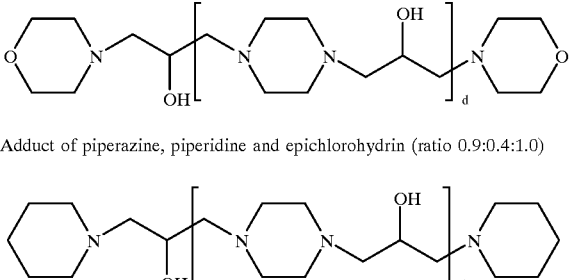 | |
| 15 | Adduct of piperazine, piperidine and epichlorohydrin (ratio 0.9:0.4:1.0) | 0.8 |
| | 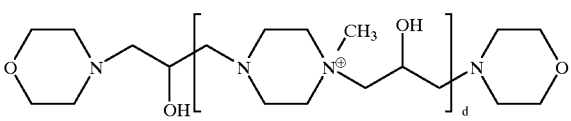 | |
| 16 | Adduct of piperazine, morpholine and epichlorohydrin (ratio 0.9: 0.4:1.0) methyl quat | 0.8 |
| | 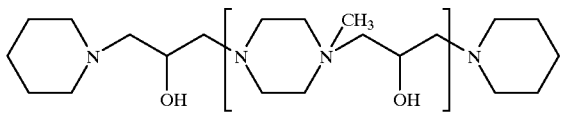 | |
| 17 | Adduct of piperazine, piperidine and epichlorohydrin (ratio 0.9:0.4:1.0) methyl quat | 0.8 |
| | 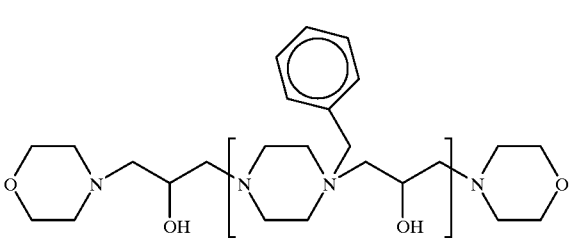 | |
| 18 | Adduct of piperazine, morpholine and epichlorohydrin (ratio 0.9:0.4:1.0) benzyl quat | 0.8 |
| |  | |
| 19 | Adduct of piperazine, piperidine and epichlorohydrin (ratio 0.9:0.4:1.0) benzyl quat | 0.8 |

TABLE 11-continued

The chemical structures shown in the examples below are idealized structures. Side reactions expected to occur during the condensation are not shown.

| Example | Material | Level (wt %) |
|---|---|---|
| 20 | Adduct of imidazole, piperazine and epichlorohydrin (ratio 2:1:3) | 0.8 |
| 21 | Adduct of imidazole, piperazine and epichlorohydrin (ratio 1:1:2) | 0.8 |
| 22 | Adduct of imidazole, 1,6 diaminohexane and epichlorohydrin (ratio 1:1:2) | 0.8 |
| 23 | Adduct of imidazole, dimethylaminopropylamine and epichlorohydrin (ratio 1.02:0.34:1.0) | 0.8 |

What is claimed is:

1. A detergent composition comprising:
a) from 5% to 80% by weight of surfactants selected from the group consisting of nonionic, anionic, cationic, amphoteric zwitterionic surfactants and mixtures thereof; and b) from 0.01% to 5.0% by weight of a mixture of cyclic amine based polymers, oligomers or copolymers of the general formula:

$$T-[W-R_2]_x-W-T \; A_b,$$

wherein each T is independently selected from the group consisting of H, $C_1-C_{12}$ alkyl, substituted alkyl, $C_7-C_{12}$ alkylaryl,

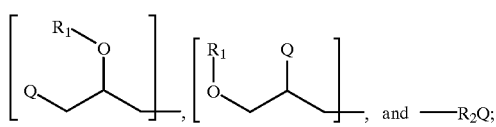

wherein W comprises at least one cyclic constituent selected from the group consisting of:

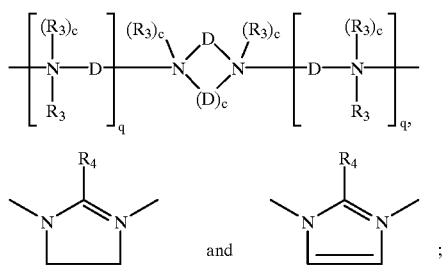

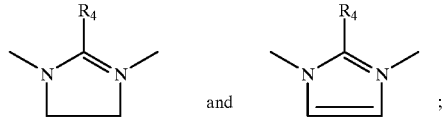

in addition to the at least one cyclic constituent, W may also comprise an aliphatic or substituted aliphatic moiety of the general structure;

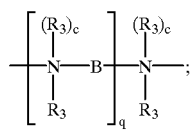

each B is independently $C_1$–$C_{12}$ alkylene, $C_1$–$C_{12}$ substituted alkylene, $C_3$–$C_{12}$ alkenylene, $C_8$–$C_{12}$ dialkylarylene, $C_8$–$C_{12}$ dialkylarylenediyl, and —$(R_5O)_nR_5$—;

each D is independently $C_2$–$C_6$ alkylene;

each Q is independently selected from the group consisting of hydroxy, $C_1$–$C_{18}$ alkoxy, $C_2$–$C_{18}$ hydroxyalkoxy, amino, $C_1$–$C_{18}$ alkylamino, dialkylamino, trialkylamino groups, heterocyclic monoamino groups and diamino groups;

each $R_1$ is independently selected from the group consisting of H, $C_1$–$C_8$ alkyl and $C_1$–$C_8$ hydroxyalkyl;

each $R_2$ is independently selected from the group consisting of $C_1$–$C_{12}$ alkylene, $C_1$–$C_{12}$ alkenylene, —$CH_2$—$CH(OR_1)$—$CH_2$, $C_8$–$C_{12}$ alkarylene, $C_4$–$C_{12}$ dihydroxyalkylene, poly($C_2$–$C_4$ alkyleneoxy)alkylene, $H_2CH(OH)CH_2OR_2OCH_2CH(OH)CH_2$—, and $C_3$–$C_{12}$ hydrocarbyl moieties;

provided that when $R_2$ is a $C_3$–$C_{12}$ hydrocarbyl moiety the hydrocarbyl moiety can comprise from about 2 to about 4 branching moieties of the general structure:

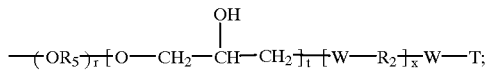

each $R_3$ is independently selected from the group consisting of H, $R_2$, $C_1$–$C_{20}$ hydroxyalkyl, $C_1$–$C_{20}$ alkyl, substituted alkyl, $C_6$–$C_{11}$ aryl, substituted aryl, $C_7$–$C_{11}$ alkylaryl, and $C_1$–$C_{20}$ aminoalkyl;

each $R_4$ is independently selected from the group consisting of H, $C_1$–$C_{22}$ alkyl, $C_1$–$C_{22}$ hydroxyalkyl, aryl and $C_7$–$C_{22}$ alkylaryl;

each $R_5$ is independently selected from the group consisting of $C_2$–$C_8$ alkylene, $C_2$–$C_8$ alkyl substituted alkylene; and A is a compatible monovalent or di or polyvalent anion;

M is a compatible cation;

b=number necessary to balance the charge;

each x is independently from 3 to about 1000;

each c is independently 0 or 1;

each h is independently from about 0 to about 8;

each q is independently from 0 to about 6;

each n is independently from 0 to about 20;

each r is independently from 0 to about 20; and each t is independently from 0 to 1.

2. The detergent composition of claim 1, wherein the cyclic amine based polymers, oligomers or copolymers are adducts selected from the group consisting of piperazine, piperadine, epichlorohydrin, epichlorohydrin benzyl quat, epichlorohydrin methyl quat, morpholine and mixtures thereof.

3. The detergent composition of claim 1, wherein each $R_1$ is H and at least one W is selected from the group consisting of:

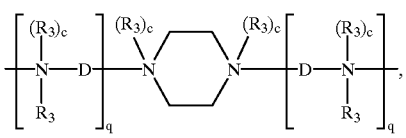

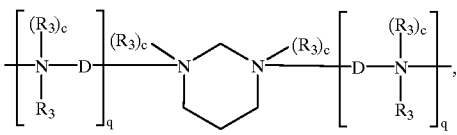

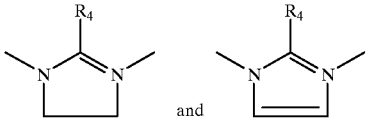

4. The detergent composition of claim 1, wherein each $R_1$ is H and at least one W is selected from the group consisting of:

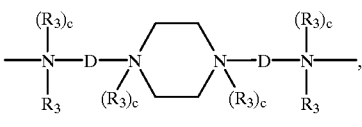

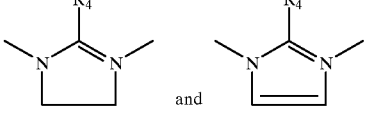

5. The detergent composition of claim 1, wherein each $R_1$ is H and at least one W is selected from the group consisting of:

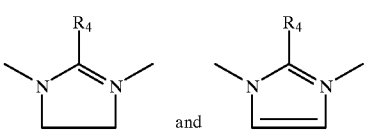

6. The laundry additive composition of claim 1, wherein the cyclic amine based polymers, oligomers or copolymers are adducts of two or more compositions selected from the group consisting of piperazine, piperadine, epichlorohydrin, epichlorohydrin benzyl quat, epichlorohydrin methyl quat, morpholine and mixtures thereof.

7. The detergent composition of claim 1, wherein $R_2$ is selected from the group consisting of polyepoxides, ethylenecarbonate, propylenecarbonate, urea, α, β-unsaturated carboxylic acids, esters of α, β-unsaturated carboxylic acids, amides of α, β-unsaturated carboxylic acids, anhydrides of α, β-unsaturated carboxylic acids, di- or polycarboxylic acids, esters of di- or polycarboxylic acids, amides of di- or polycarboxylic acids, anhydrides of di- or polycarboxylic acids, glycidylhalogens, chloroformic esters, chloroacetic esters, derivatives of chloroformic esters, derivatives of chloroacetic esters, epihalohydrins, glycerol dichlorohydrins, bis-(halohydrins), polyetherdihalocompounds, phosgene, polyhalogens, functionalized glycidyl ethers and mixtures thereof.

* * * * *